(12) United States Patent
Hagiwara

(10) Patent No.: US 10,380,663 B2
(45) Date of Patent: Aug. 13, 2019

(54) SYSTEM, APPLICATION AND METHOD FOR GENERATING PROPOSED STATE TO MAINTAIN TOTAL OUTPUT VOLUMES

(71) Applicant: Ricoh Company, Ltd., Tokyo (JP)

(72) Inventor: Kenji Hagiwara, Edgewater, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 634 days.

(21) Appl. No.: 15/077,806

(22) Filed: Mar. 22, 2016

(65) Prior Publication Data

US 2017/0278160 A1  Sep. 28, 2017

(51) Int. Cl.
*G06Q 30/00* (2012.01)
*G06Q 30/06* (2012.01)
*G06F 3/0484* (2013.01)
*G06F 3/0482* (2013.01)

(52) U.S. Cl.
CPC ....... *G06Q 30/0611* (2013.01); *G06F 3/0482* (2013.01); *G06F 3/04842* (2013.01)

(58) Field of Classification Search
CPC .................................. G06Q 30/06–08
USPC ................................. 705/26.1–27.2
See application file for complete search history.

(56) References Cited

U.S. PATENT DOCUMENTS

| 9,007,631 B2 | 4/2015 | Hagiwara et al. |
| 9,130,838 B2 | 9/2015 | Anderson et al. |
| 2006/0178917 A1* | 8/2006 | Merriam .......... G06Q 10/06312 705/7.22 |
| 2014/0222980 A1 | 8/2014 | Hagiwara et al. |
| 2014/0223512 A1 | 8/2014 | Hagiwara et al. |
| 2015/0193416 A1 | 7/2015 | Hagiwara et al. |
| 2015/0193469 A1 | 7/2015 | Hagiwara et al. |
| 2015/0213381 A1 | 7/2015 | Hagiwara |
| 2015/0220953 A1 | 8/2015 | Hagiwara et al. |

OTHER PUBLICATIONS

U.S. Appl. No. 13/758,082, Kenji Hariwara Tom Haapanen Arturo Hung Tse, Device Management Apparatus, System and Method Including Remote Configuration of Device Preference Settings, US 2014/0222980 A1.
U.S. Appl. No. 13/758,089, Kenji Hagiwara Jim Vopni Shun Tanaka, Customizing Security Role in Device Management System, Apparatus and Method, US 2014/0223512 A1.
U.S. Appl. No. 13/758,097, Kenji Hagiwara Jim Vopni Shun Tanaka, System, Apparatus and Method for Managing Heterogeneous Group of Devices, U.S. Pat. No. 9,007,631.
U.S. Appl. No. 13/758,110, Greg Anderson Tom Haapanen Kenji Hagiwara, Device Management System, Apparatus and Method Configured for Customizing a Power Filter, U.S. Pat. No. 9,130,838.
U.S. Appl. No. 14/172,600, Kenji Hagiwara Bard Dema, Systems, Apparatuses and Methods for Performing Enterprise Analysis and Site Analysis of Information Technology Costs, US 2015/0220953 A1.

(Continued)

*Primary Examiner* — Ethan D Civan
(74) *Attorney, Agent, or Firm* — Duft & Bornsen, PC

(57) ABSTRACT

Systems, apparatuses, applications and methodologies are configured to assist a user to generate a proposed state (e.g., a proposed fleet of devices), for a customer, that largely maintains total output volumes. Thus, obtaining a proposed state analysis can become a manageable task.

13 Claims, 25 Drawing Sheets

(56) References Cited

OTHER PUBLICATIONS

U.S. Appl. No. 14/164,746, Kenji Hagiwara, System, Apparatus and Method for Performing Enterprise Analysis of Information Technology Provisions and Costs, US 2015/0213381 A1.
U.S. Appl. No. 14/151,114, Kenji Hagiwara Greg Melendez, Adding Annotations to a Map, US 2015/0193416 A1.
U.S. Appl. No. 14/151,124, Kenji Hagiwara Michael Charity, Searching for Devices in an Information Technology Environement With Aid of Maps, US 2015/0193469 A1.
U.S. Appl. No. 15/058,370, Kenji Hagiwara, Generating Proposed Model List for Proposed State Analysis, pending.
U.S. Appl. No. 15/062,521, Kenji Hagiwara, System, Apparatus and Method for Generating a Proposed State Analysis, pending.
U.S. Appl. No. 15/064,433, Kenji Hagiwara, System, Apparatus and Method for Automatically Generating a Proposed State, pending.
U.S. Appl. No. 15/071,089, Kenji Hagiwara, System, Apparatus and Method for Generating a Proposed State Based on a Contract, pending.
U.S. Appl. No. 15/058,370 of Kenji Hagiwara, filed Mar. 2, 2016.
U.S. Appl. No. 15/062,521 of Kenji Hagiwara, filed Mar. 7, 2016.
U.S. Appl. No. 15/064,433 of Kenji Hagiwara, filed Mar. 8, 2016.
U.S. Appl. No. 15/071,089 of Kenji Hagiwara, filed Mar. 15, 2016.
U.S. Appl. No. 15/081,114, Kenji Hagiwara, System, Application and Method for Generating Proposed State Floormap, pending.
U.S. Appl. No. 15/081,114 of Kenji Hagiwara filed Mar. 25, 2016.

* cited by examiner

New State Analysis

Current State Analysis

Import Device Information from Customer

Please upload the file containing information regarding the devices at each site (s)

Site A (Montreal Office): [MontrealDevices.xlsx] [View] Import File

[Next] [Cancel]

Fig. 6D

Current State Analysis

MontrealDevices.xlsx

| ID | Model Name | Manufacturer | Type | Mono/Color | Actual Output Volume | Release Date |
|---|---|---|---|---|---|---|
| 1 | MP C100 | Ricoh | MFP | Mono | 110,000 | 2015/11/05 |
| 2 | XV P200 | Ricoh | MFP | Color | 30,000 | 2013/06/05 |
| 3 | Artisan | ABC | Printer | Color | 60,000 | |

[Fill in Blanks] [Save As] [Cancel]

[Next] [Cancel]

Fig. 6E

New State Analysis

MontrealDevices.xlsx

| ID | Model Name | Manufacturer | Type | Mono/Color | Output Volume | Release Date |
|---|---|---|---|---|---|---|
| 1 | MP C100 | Ricoh | MFP | Mono | 110,000 | 2015/11/05 |
| 2 | XV P200 | Ricoh | MFP | Color | 30,000 | 2013/06/05 |
| 3 | Artisan | Ricoh | Printer | Color | 60,000 | 2015/01/25 |

Fill in Blanks     Save As     Cancel

Next     Cancel

Fig. 6F

New State Analysis

Current State Analysis

Import Device Information from Customer

Please upload the file containing information regarding the devices at each site (s)

Site A (Montreal Office): [MontrealDevices(rev).xlsx]  [View]   Import File

[Cancel]

[Next]

Fig. 6G

Proposed State Analysis

Current v. Proposed

Proposed State Analysis

Generate Proposed State Analysis

Please select the site to create a Proposed State for (and to keep total monthly output volume):

○ Site A (New York Office)

● Site B (Montreal Office)
  ☐ Main Building
  ☐ Management Division
  ☐ Marketing Division
  ☐ Secondary Building

[ Cancel ]
[ Next ]

Fig. 8C

Proposed State Analysis

Current v. Proposed

Please Feel Free to Modify, Delete or Add Devices to the List Below

Device List (Montreal Office)　　　　　　　　　　　　　Keep Total Output Volumes At: 200,000 (edit)

| Model Name | Manufacturer | Type | Mono/Color | Output Volume | Release Date | Delete? | Modify? |
|---|---|---|---|---|---|---|---|
| MP C100 | Ricoh | MFP | Mono | 110,000 | 2015/11/05 | Delete | Modify |
| XV P200 | Ricoh | MFP | Color | 30,000 | 2013/06/05 | Delete | Modify |
| Artisan | ABC | Printer | Color | 60,000 | 2015/01/25 | Delete | Modify |

+ Add Device

[ Next ]　　　　　　　　　　　　　　　　　　[ Back ]

Current v. Proposed

Proposed State Analysis

Please Feel Free to Modify, Delete or Add Devices to the List Below

Device List (Montreal Office)      Keep Total Output Volumes At: 200,000 (edit)

| Model Name | Manufacturer | Type | Mono/Color | Output Volume | Release Date | Delete? | Modify? |
|---|---|---|---|---|---|---|---|
| MP C100 | Ricoh | MFP | Mono | 95,000 | 2015/11/05 | Delete | Modify |
| XV P200 | Ricoh | MFP | Color | 15,000 | 2013/06/05 | Delete | Modify |
| Artisan | ABC | Printer | Color | 45,000 | 2015/01/25 | Delete | Modify |
| MP C3003 | Ricoh | MFP | Color | 45,000 | 2014/02/25 | Delete | Modify |

+ Add Device

[Next] [Back]

Fig. 8F

Proposed State Analysis

Please Feel Free to Modify, Delete or Add Devices to the List Below

Device List (Montreal Office)　　　　　　　　　　　　　　　　Keep Total Output Volumes At: 200,000 (edit)

| Model Name | Manufacturer | Type | Mono/Color | Output Volume | Release Date | Delete? | Modify? |
|---|---|---|---|---|---|---|---|
| MP C100 | Ricoh | MFP | Mono | 140,000 | 2015/11/05 | Delete | Modify |
| XV P200 | Ricoh | MFP | Color | 60,000 | 2013/06/05 | Delete | Modify |

+ Add Device

Next　　Back

Fig. 8H

Proposed State Analysis

Please Feel Free to Modify, Delete or Add Devices to the List Below

Device List (Montreal Office)                                     Keep Total Output Volumes At: 200,000 (edit)

| Model Name | Manufacturer | Type | Mono/Color | Output Volume | Release Date | Delete? | Modify? |
|---|---|---|---|---|---|---|---|
| MP C100 | Ricoh | MFP | Mono | 80,000 | 2015/11/05 | Delete | Modify |
| XV P200 | Ricoh | MFP | Color | 75,000 | 2013/06/05 | Delete | Modify |
| Artisan | ABC | Printer | Color | 45,000 | 2015/01/25 | Delete | Modify |

+ Add Device

[ Next ]    [ Back ]

Fig. 8J

Proposed State Analysis

*Proposed State Analysis (Future Montreal Devices) Generated*

| | Model Name | Manufacturer | Type | Mono/Color | Output Volume | Release Date |
|---|---|---|---|---|---|---|
| 1 | MP C100 | Ricoh | MFP | Mono | 80,000 | 2015/11/05 |
| 2 | XV P200 | Ricoh | MFP | Color | 75,000 | 2013/06/05 |
| 3 | Artisan | ABC | Printer | Color | 45,000 | 2015/01/25 |
| 4 | MP C100 | Ricoh | MFP | Mono | 80,000 | 2015/11/05 |

Back

Finish

Fig. 8K

SYSTEM, APPLICATION AND METHOD FOR GENERATING PROPOSED STATE TO MAINTAIN TOTAL OUTPUT VOLUMES

TECHNICAL FIELD

This disclosure relates to systems, apparatuses, methodologies and other tools for generating a proposed state (e.g., a proposed fleet of devices), and more specifically, tools including provisions to generate a proposed state analysis based on a current state analysis and total output volumes.

BACKGROUND

In the current information age, information technology (IT) tools are extensively used in enterprises and other organizations in order to facilitate communication and processing of information, documents, data, etc. Indeed, it is now rare to find a workflow in an enterprise that does not employ IT tools. The number of IT assets [such as software, computers, printers, scanners, multi-function devices (MFDs), other network-connected or standalone devices] is generally increasing and, as a result, managing IT assets to meet enterprise needs is becoming a daunting task.

One approach for a vendor to make an educated and intriguing sales pitch to a customer or prospective customer is to present a proposal along with an analysis of the current IT expenditures of the customer or prospective customer. For example, a customer may wish to know, and a current state analysis may be prepared to show, total cost of ownership, or expected expenditures (such as for consumables) for devices [e.g., printers, scanners, facsimile devices, multi-function peripherals (MFP), etc.] for each period of one or more months, a year, 3 years, etc., output volumes, etc. Accordingly, the vendor typically attempts to determine the current IT assets of the customer or prospective customer and then collate information such as, but not limited to, acquisition type (i.e. lease/purchase), acquisition cost, depreciation of product, service cost, and in the case of printing products/services, consumables (e.g., paper, ink, toner, etc.) usage or cost, output, etc. Further, the vendor may analyze the needs of the customer or prospective customer in order to be able to offer a package of products and/or services that is attractive to the customer or prospective customer.

However, there exists a need for an improved approach for generating a proposed fleet of devices for consideration.

SUMMARY

Various tools (e.g., systems, apparatuses, methodologies, application software, computer program products, etc.) can be configured to include any combination of various aspects and features described herein, to facilitate generation of a proposed state (e.g., a proposed fleet of output devices) for an enterprise (or another organization) or an enterprise site. Such tool can be employed by sales or marketing personnel, as well as by a customer, in a case of new sale, as well as in the instance of contract renewal, to obtain a proposed state analysis of a proposed fleet for the customer. For example, the tool can be configured to generate a proposed state automatically while maintaining total output volumes as much as possible, or to include an option that can be selected by the user to keep total output volumes the same (or approximately the same). That is, there are many instances in which the user like to keep monthly output volumes (e.g., number of copies, prints, etc.) the same as between the current state and a proposed state, since in most cases, the work style and daily copier or printer usage of the device users would not change even if the fleet of devices are replaced with new devices (or if devices are moved or disposed, or if configuration of devices are changed after the proposed state is accepted by customer).

While the proposed state generation is automated as much as possible, it is generally desirable for the tool (e.g., an output management application) to provide the user with an application user interface to permit the user to modify and edit the proposed state. Such application user interface in the output management application may be configured to permit a user to (i) specify a site or customer for which a proposed state is to be prepared and (ii) select an option to keep total output volumes the same as that of the current state.

For example, the application may retrieve a current state analysis and use the current state analysis as a starting point for the proposed state for the specified site or customer, and when the user operates the application user interface to perform any one or more of add a device to the proposed state, delete a device from the proposed state, and modify an allotted monthly volume usage of a specified device in the proposed state, a proposed state review module calculates total output volumes for the proposed state, and performs a comparison of (a) total output volumes for the output devices in the current state analysis, and (b) the total output volumes for the output devices in the proposed state. When the total output volumes for the output devices in the proposed state is different from the total output volumes for the output devices in the current state analysis, the application user interface displays a notification that indicates a difference in the total output volumes as between the proposed state and the current state analysis. Further, the application user interface can additionally or alternatively display the total output volumes for the proposed state and the current state analysis for the output devices and display the difference in total output volumes. The application user interface may be configured for the user to modify the allotted monthly volume usage of the specified device manually, in the proposed state.

On the other hand, in another aspect, the output management application may be configured to automatically, when the keep total output volumes same option has been selected, adjust for each output device in the proposed state, the allotted monthly volume usage of the output device to reduce the difference in total output volumes as between the proposed state and the current state analysis.

For example, when the total output volumes for the output devices in the proposed state for the logical unit is greater than that in the current state analysis, the difference in the total output volumes as between the proposed state and the current state analysis for the logical unit can be divided amongst the one or more output devices in the proposed state for the logical unit, to reduce the allotted monthly volume usage of the output device by the divide difference. In another approach, the allotted monthly volume usage of each output device in the proposed state can be reduced by a percentage of the total output volumes for the output devices in the proposed state constituted by the difference in total output volumes as between the proposed state and the current state analysis for the logical unit. In either instance, when the allotted monthly volume usage of the output devices in the proposed state is adjusted, the application user interface may display (i) the total output volumes for the proposed state and the current state analysis for the output devices in the logical unit, and/or a message indicating that adjustment of the allotted monthly volume usage has been automatically performed for the output devices in the proposed state for the logical unit and a reverse adjustment UI part may be provided in the application user interface for the user to request that the adjustment be reversed.

BRIEF DESCRIPTION OF THE DRAWINGS

The aforementioned and other aspects, features and advantages can be more readily understood from the following detailed description with reference to the accompanying drawings wherein:

FIGS. 6A-6H show respective examples of user interface screens which can be provided on a terminal apparatus, according to an exemplary embodiment;

FIGS. 8A-8K show respective examples of user interface screens which can be provided by a terminal apparatus, according to an exemplary embodiment.

DETAILED DESCRIPTION

Figure 1A:
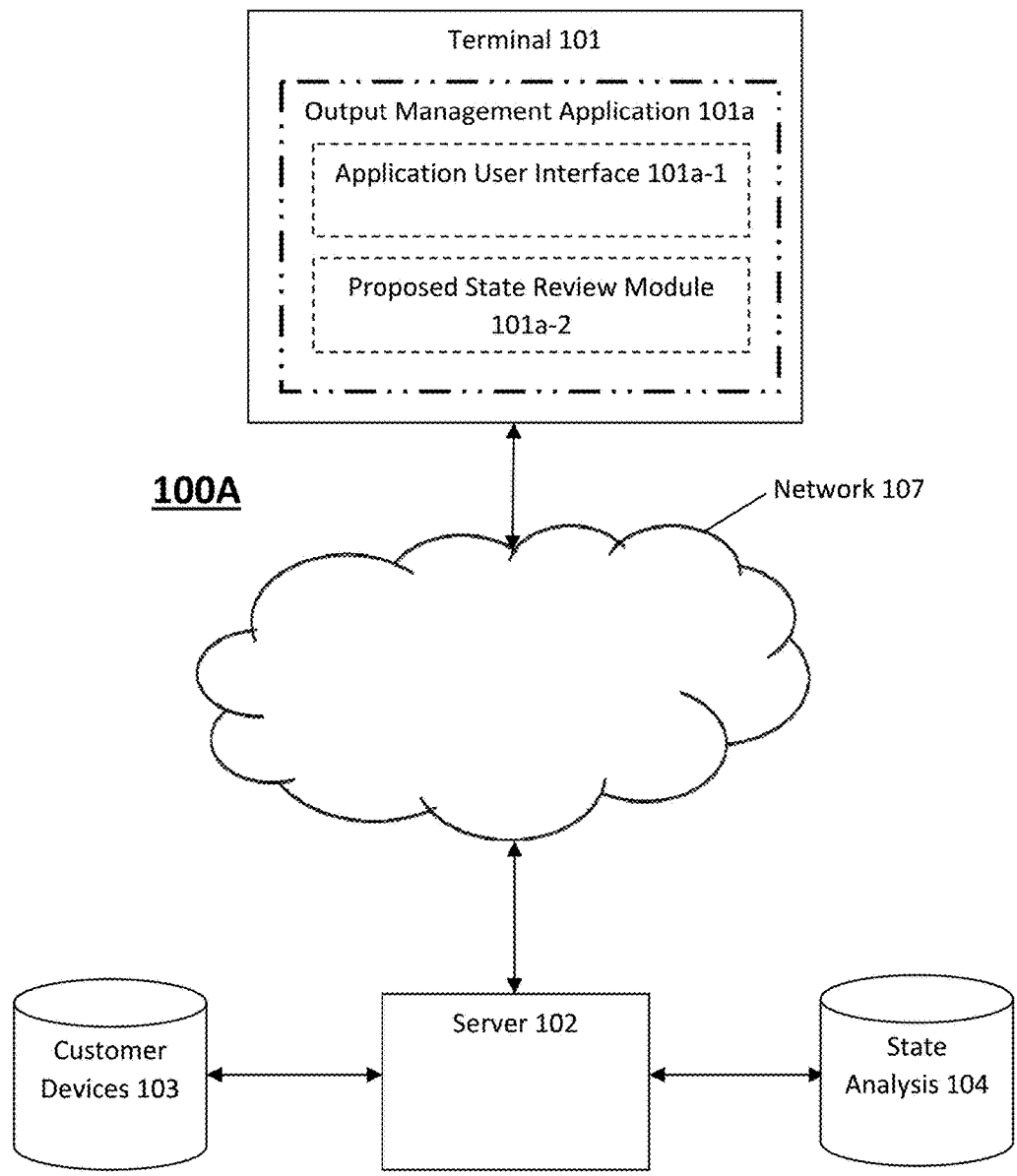
FIG. 1A shows a block diagram of a system within which an output management application can operate to generate a proposed state, according to an exemplary embodiment.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various aspects of proposed state generation are discussed herein, with reference to an output management application. It should be appreciated by those skilled in the art that any one or more of such aspects or features may be embedded in another application and/or in any of various other ways, and thus while various examples are discussed herein, the inventive aspects of this disclosure are not limited to such examples described herein.

FIG. 1A shows schematically a system 100A that includes a terminal 101 and a server 102 which are interconnected by network 107. Although only one terminal 101 is shown in FIG. 1A, it should be understood that the system 100A can include a plurality of terminal devices (which can have similar or different configurations).

The terminal 101 can be any computing device, including but not limited to a personal, notebook, tablet or workstation computer, a mobile phone or handset, another information terminal, etc., that can communicate with other devices through the network 107. The terminal 101 is further described infra with reference to FIG. 3.

The output management application 101a may be provided on or to the terminal 101 and provides an application interface thereon through which a user can request an analysis of a fleet of devices. Such application may be a native program installed on the terminal 101, or may be provided from an external source as an application and/or as part of a platform or service (e.g., software as a service, i.e. SaaS), or may be provided as a web page.

The output management application 101a is configured to perform analysis and calculations with regards to a set (or fleet) of one or more specified devices. Such analysis may be performed on an existing set of devices (e.g., a fleet of devices employed by a particular organization) or a proposed set of devices (e.g., a list of devices recommended to the organization for purchase, lease, etc.). Such analysis may be performed for the purpose of determining a set of devices that can meet the needs of a customer, in an optimal manner preferably.

When, for example, a new customer seeks a proposal for updating its fleet of output devices, a vendor would typically like to know what devices are currently employed by the customer in the customer's fleet. Such information may be sent to the vendor in various forms. For example, the customer may send a list of the devices constituting the current fleet to the vendor in an electronic format (e.g., spreadsheet, e-mail, etc.) or by paper (e.g., handwriting, typed, etc.). In another example, the customer may simply tell the vendor (e.g., meetings, telephone conference, etc.) what devices the specific customer currently possesses. After receiving information regarding the current devices from the specific customer, the vendor can utilize (that is, as a user of) the device and service management application 101a to create a current state analysis which includes the list of devices currently possessed by the customer. It should be noted that the analysis may be performed for each device individually and/or the entirety of the devices at a site.

The application user interface (UI) 101a-1 through which the user can generate a proposed state and/or request a proposed state analysis, presents, to the user of terminal 101, an interface in which the user can create and modify a proposed state. In many instances, a copy of the current state analysis data is employed as an initial starting point for a proposed state. For example, such a copy includes all of the devices that were in the selected current state analysis.

The proposed state review module 101a-2 determines the total monthly output volumes total monthly output volumes for the devices in the proposed state analysis. In other words, the proposed state review module 101a-2 calculates a device monthly output volume for each device and adds them together to obtain a total monthly output volume. It should be noted that the monthly output volume is the number of pages that can be printed in a month before permanent damage is done to the device. For example, device A may have a device monthly output volume of 40,000. For device A to continue functioning normally until the end of its intended life cycle, the number of pages printed each month must not exceed 40,000.

When a user revises the proposed state analysis (e.g., add devices, delete devices, modify devices) in a manner in which the total monthly output volumes of the devices in the proposed state analysis are altered, the proposed state review module 101a-2 calculates for each revision made, the new total monthly output volume. Next, the proposed state review module 101a-2 retrieves the original total monthly output volume (i.e. total monthly output volume of devices in the current state analysis that the proposed state analysis is based on) and compares the original total monthly output volume and the new monthly total output volume. In the case that the original total monthly output volume and the new total monthly output volume are of different values, the proposed state review module 101a-2 causes the application user interface (UI) 101a-1 to display a notification that shows the difference between the new total output volume and the original total output volume. Next, the proposed state review module 101a-2 may also adjust device output volume each of the devices in the proposed state analysis.

The server 102 may be used to access information regarding state analyses, customer device models, and contracts data which are stored in the customer devices database 103 and state analyses database 104. The user may access the server 102 to obtain data from any of the databases 103 (e.g., previously registered current/proposed state analyses) and 104 (e.g., information regarding customer devices) without having to manually input the information. The server 102 is further described infra with reference to FIG. 2.

The customer devices database 103 may include information regarding a fleet of devices (e.g., printer, MFP, scanner, facsimile machine, etc.) for each customer. In other words, each customer may have an office, at a certain geographical location (e.g., city, town, etc.), that may include a fleet of devices. Information regarding each of the devices in the fleet of devices, such as name or identifier (e.g., device name, walkthrough ID, Asset tag, etc.), device type (e.g., printer, MFP, scanner, etc.), device functions (e.g., black & white, duplex, fax, scanning, N-up, etc.), physical location, network address (e.g., IP address, MAC address, etc.), output technology (e.g., laser, inkjet solid ink, thermal, other technology, etc.), supply level (e.g., level of consumable, such as paper and toner, is empty, low, ok, etc.), pages per job (e.g., 1, 2, 6-10, etc.), color technology (e.g., professional color, convenience color, etc.), device properties (e.g., manufacturer, model, serial number, etc.), etc. are stored in the customer devices database 103.

In another example, the customer device information in the customer devices database 103 may in the form of a spreadsheet (e.g., Excel). In other words, the user may request from the customer information on the fleet of devices currently possessed by the customer by having the customer fill out an electronic spreadsheet with data (e.g., identifier, device type, functions, color technology, etc.) corresponding to each device. Such spreadsheet may be sent to the user electronically (e.g., e-mail), after which, the spreadsheet is stored in the customer devices database 103.

The state analysis database 104 registers any type of state analyses previously created by the user. In other words, the state analysis database 104 may include current state analyses corresponding to one or more customers and/or previously created proposed analyses. It should be noted that the database does not necessarily link a proposed state analysis for a particular customer. In other words, a proposed state analysis may be created in future anticipation of a type of customer. For example, the company that the user works for may have a specific proposed state analysis which includes one or more recently created products (to be used together) that are designed for companies in the information technology (IT) industry. However, the company employing the user may not yet have any customers from the IT industry. As a result, there is no company linked with the specific proposed state analysis. When the output management application 101a receives instructions to create a proposed state analysis, the output management application 101a may request access to the state analysis database 104 from the server 102 for the purpose of obtaining an existing current/proposed state analysis.

The network 107 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 107. In addition, the network 107 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
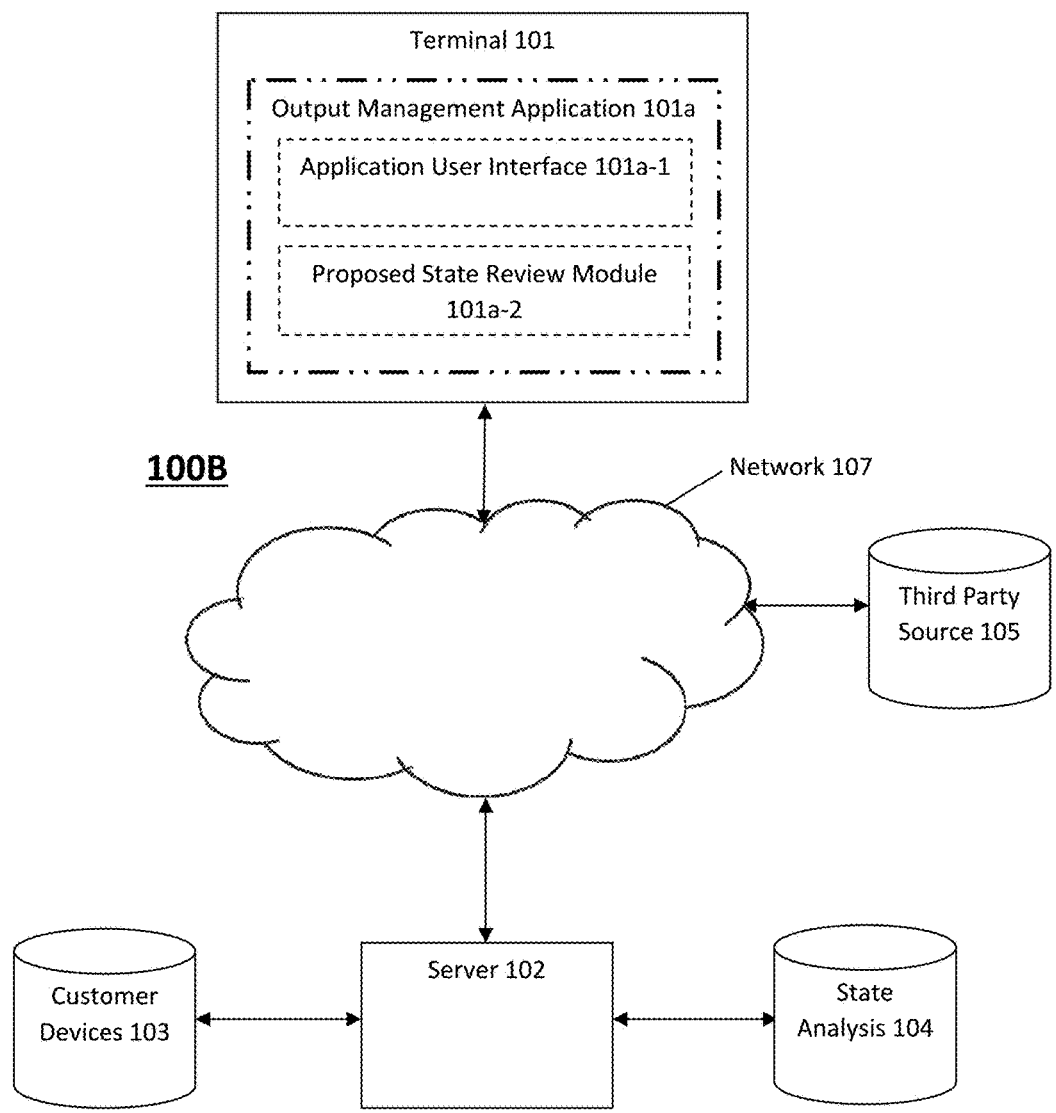
FIG. 1B shows a block diagram of a system within which an output management application can operate to generate a proposed state, according to another exemplary embodiment.

FIG. 1B shows schematically a system 100B, according to another exemplary embodiment. The system 100B is similar to the system 100A of FIG. 1A except that the system additionally includes a third party source 105.

The third party source database 106 may be databases maintained by any number of third party entities. Further, there may more than one third party source database connected to the network 107. For example, the third party source database may be maintained by an organization such as a device manufacturer, a commercial company or an online retailer. Each of the aforementioned organizations may register data regarding device models that are available on the market. In the case that the user of the terminal 101 attempts to determine the current state of the customer, such as by accessing a spreadsheet sent by the customer, the user may discover that the spreadsheet is missing certain information (e.g., price, functions, monthly volume, energy usage, etc.). The device and service management application 101a may automatically communicate with the third party source database 105 to obtain the missing device information and complete the spreadsheet.

Otherwise, operations of the elements of the system 100B are similar to those discussed in connection with the corresponding elements of the system 100A of FIG. 1A.

Figure 2:
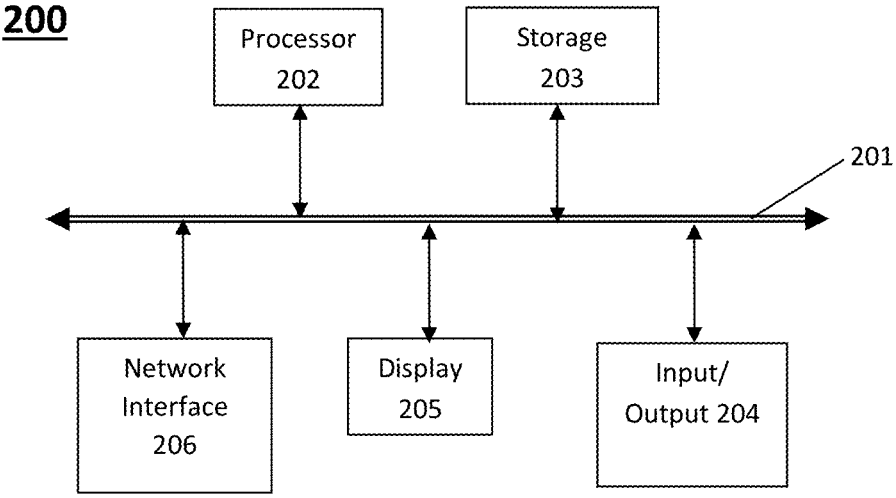
FIG. 2 shows a block diagram of an example of a configuration of a computing device that can be configured by software to operate as a server.

FIG. 2 shows an exemplary constitution of a computing device that can be configured (for example, through software) to operate (at least in part) as the terminal apparatus (e.g., 101 in FIGS. 1A and 1B) or a server (e.g., 102 in FIGS. 1A and 1B) or a host for database (e.g., 104 and 105 in FIGS. 1A and 1B; 106 in FIG. 1B).

In FIG. 2, apparatus 200 includes a processor (or central processing unit) 202 that communicates with a number of other components, including memory or storage device 203, other input/output (e.g., 10 keyboard, mouse, etc.) 204, display 205 and network interface 206, by way of a system bus 201. The apparatus 200 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art. In the apparatus 200, the processor 202 executes program code instructions that control device operations. The processor 202, memory/storage 203, input/output 204, display 205 and network interface 206 are conventional, and therefore in order to avoid obfuscating the inventive aspects of this disclosure, such conventional aspects are not discussed in detail herein.

The apparatus 200 includes the network interface 206 for communications through a network, such as communications through the network 107. However, it should be appreciated that the subject matter of this disclosure is not limited to such configuration. For example, the apparatus 200 may communicate with terminals through direct connections and/or through a network to which some components are not connected. As another example, the apparatus 200 does not need to be provided by a server that services terminals, but rather may communicate with the devices on a peer basis, or in another fashion.

The apparatus 200 of the present disclosure is not limited to a server or computer, but can be manifested in any of various devices that can be configured to communicate over a network and/or the Internet.

Figure 3:
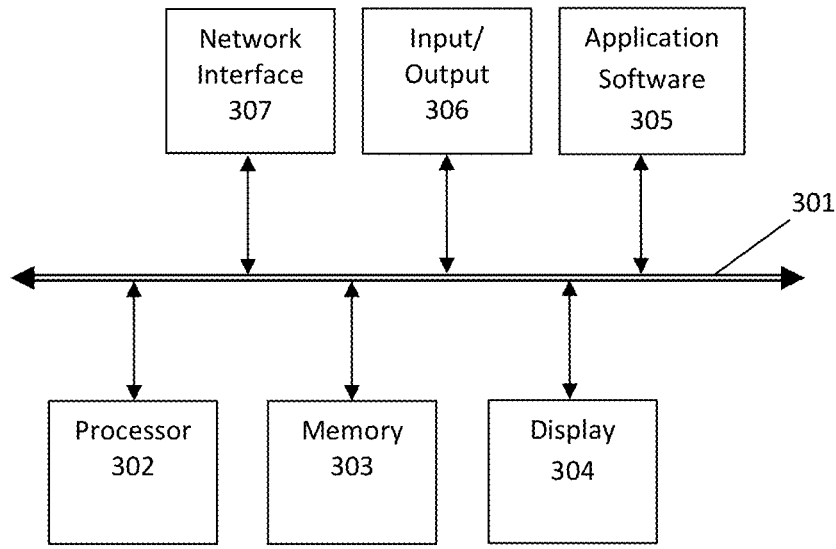
FIG. 3 shows a block diagram of an example of a configuration of a terminal or a terminal apparatus.

An exemplary constitution of the terminal 101 of FIGS. 1A and 1B is shown schematically in FIG. 3. In FIG. 3, terminal 300 includes a processor (or central processing unit) 302 that communicates with various other components, such as memory (and/or other storage device) 303, display 304, application software 305, input/output (such as keyboard, mouse, touchpad, stylus, microphone and/or speaker with voice/speech interface and/or recognition software, etc.) 306 and network interface 307, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 307 provides a connection (for example, by way of an Ethernet connection or other network connection which supports any desired network protocol such as, but not limited to TCP/IP, IPX, IPX/SPX, NetBEUI, etc.) to the network to which the computer 300 is connected (e.g., network 107 of FIGS. 1A and 1B).

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
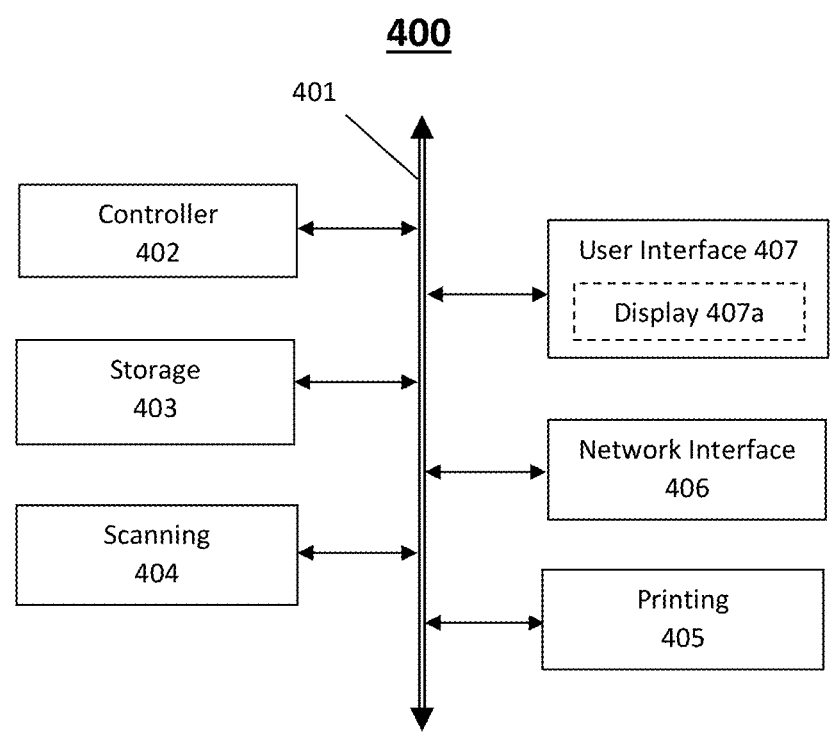
FIG. 4 shows a block diagram of an example of a configuration of a multi-function device.

FIG. 4 shows a schematic diagram of a configuration of an output device as an MFP (multi-function printer or multi-function peripheral) device. The output device 400 shown in FIG. 4 includes a controller 402, and various elements connected to the controller 402 by an internal bus 401. The controller 402 controls and monitors operations of the output device 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanning 404, printing 405, a network interface (I/F) 406, a user interface 407.

Storage 403 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the output device 400, to enable the output device 400 to interact with a terminal, as well as perhaps other external devices, through the network interface 407, and interactions with users through the user interface 407.

The network interface 406 is utilized by the output device 400 to communicate via a network with other network-connected devices such as a terminal, a server and receive data requests, print (or other) jobs, user interfaces, and etc.

The user interface 407 includes one or more electronic visual displays that display, under control of controller 402, information allowing the user of the output device 400 to interact with the output device 400. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the output device 400, so as to allow the operator to interact conveniently with services provided on the output device 400, or with the output device 400 serving as terminal for accessing electronic data or other content through the network. User interfaces or other contents received through the network via the network interface 406 can be displayed on the display screen.

The display screen does not need to be integral with, or embedded in, a housing of the output device 400, but may simply be coupled to the output device 400 by either a wire or a wireless connection. The user interface 408 may include keys and/or buttons (such as graphical keys or buttons, or other graphical elements, of a GUI on a touchscreen display 407a) for inputting information or requesting various operations. Alternatively, the user interface 407 and the display screen may be operated by a keyboard, a mouse, a remote control, voice recognition, or eye-5 movement tracking, or a combination thereof.

Scanning 404, printing 405, and network interface 406 are otherwise conventional, and therefore, a detailed description of such conventional aspects is omitted in the interest of clarity and brevity. The output device 400 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc.

Figure 5:
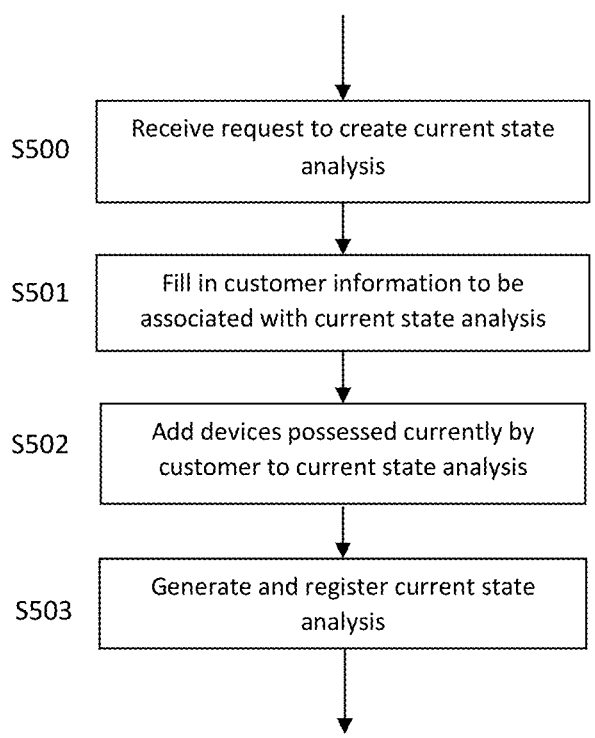
FIG. 5 shows a flow chart of a method, according to an exemplary embodiment, which can be performed in any of the systems of FIGS. 1A and 1B.

FIG. 5 shows a method that can be performed by or with an output management application (e.g., 101a) on a terminal apparatus (e.g., 101), according to an exemplary embodiment.

In an example of a workflow discussed below with reference to FIG. 6A through FIG. 6H, a manager of the customer Vespucci, Inc. determines that an existing contract (e.g., current contract) with vendor Ricoh will expire soon. The manager determines that he wants to try to renew, or create a new contract, with Ricoh, starting off with the New York office of Vespucci, Inc., and therefore the manager contacts Ricoh and asks whether there are any new devices recently manufactured by Ricoh that could replace devices that are employed by Vespucci currently since the manager thinks that one or more of the devices currently employed are outdated. A Ricoh representative (herein "the user") responds to the manager's inquiry and request information regarding what devices are currently employed at the New York office.

Figure 6A:
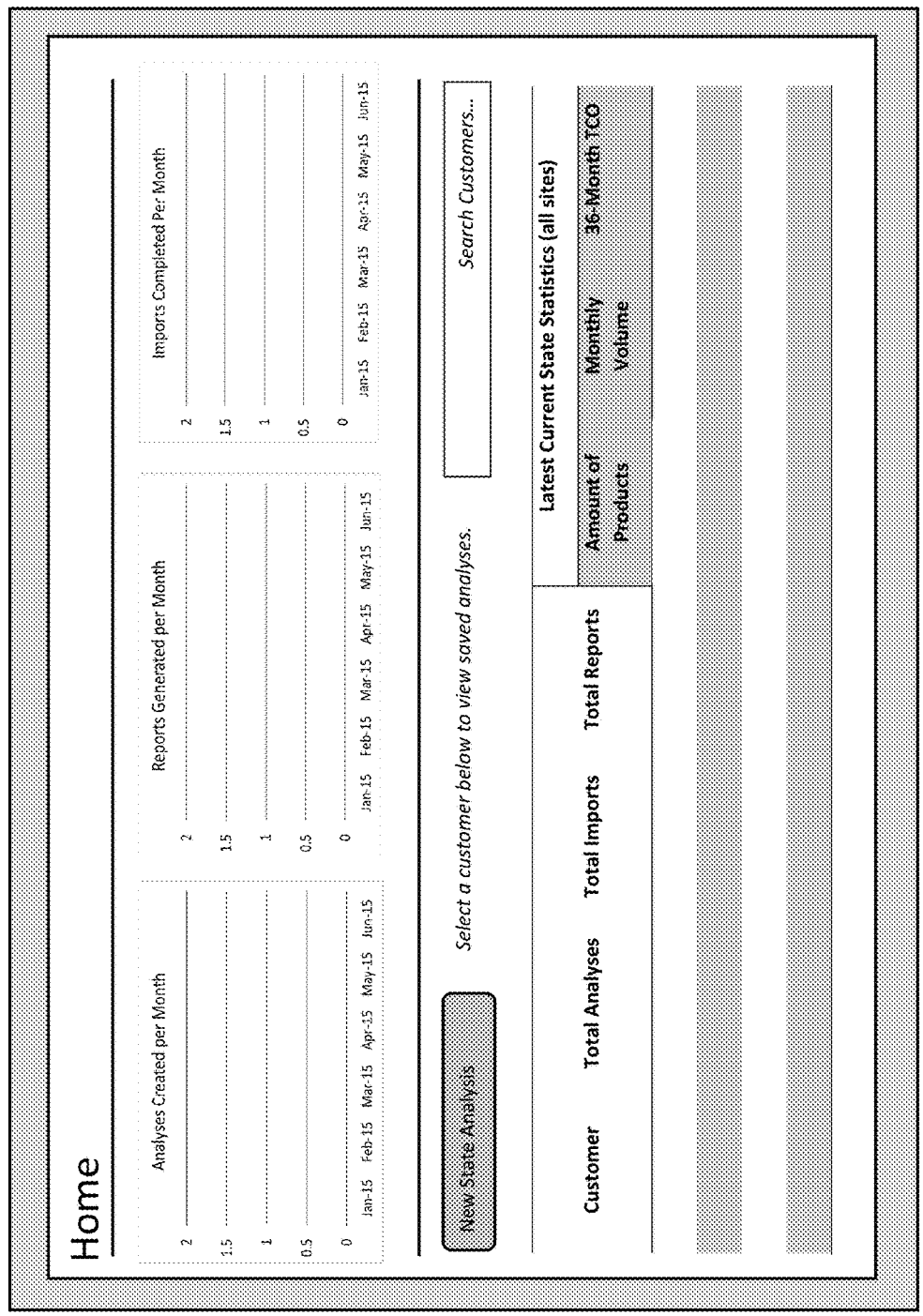
Figure 6B:
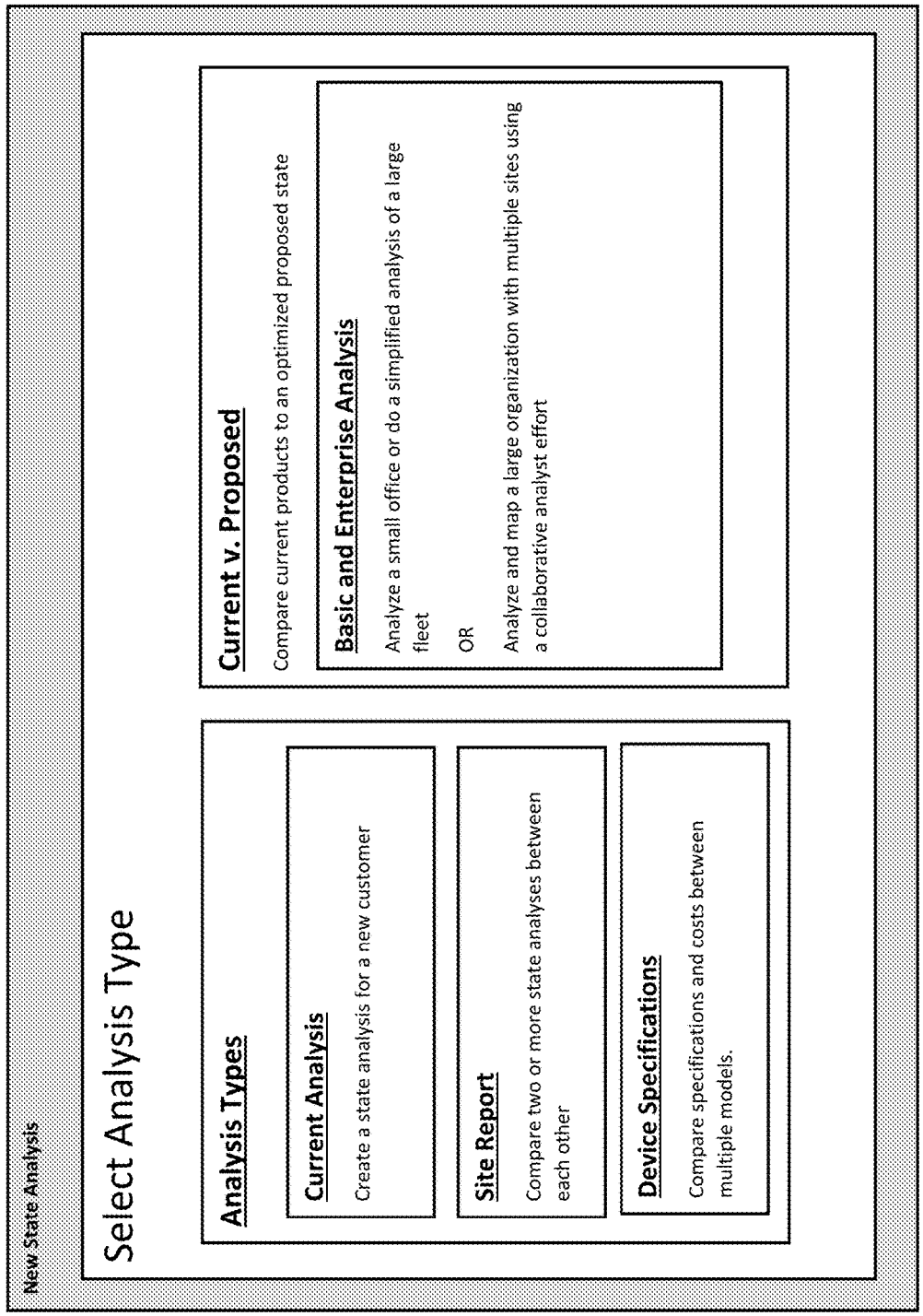

The user sends a spreadsheet to the manager and asks him to fill out the spreadsheet with information regarding devices currently employed at the New York office. The user receives an e-mail from the manager which contains the completed spreadsheet that includes all of the information regarding the devices in the New York office. Thus, the user proceeds to create a profile for the New York office, by activating the "New State Analysis" button (S500), such as shown in FIG. 6A, and since the user is doing a current state analysis for Vespucci, he activates the "Current Analysis" button, such as shown in FIG. 6B.

Figure 6C:
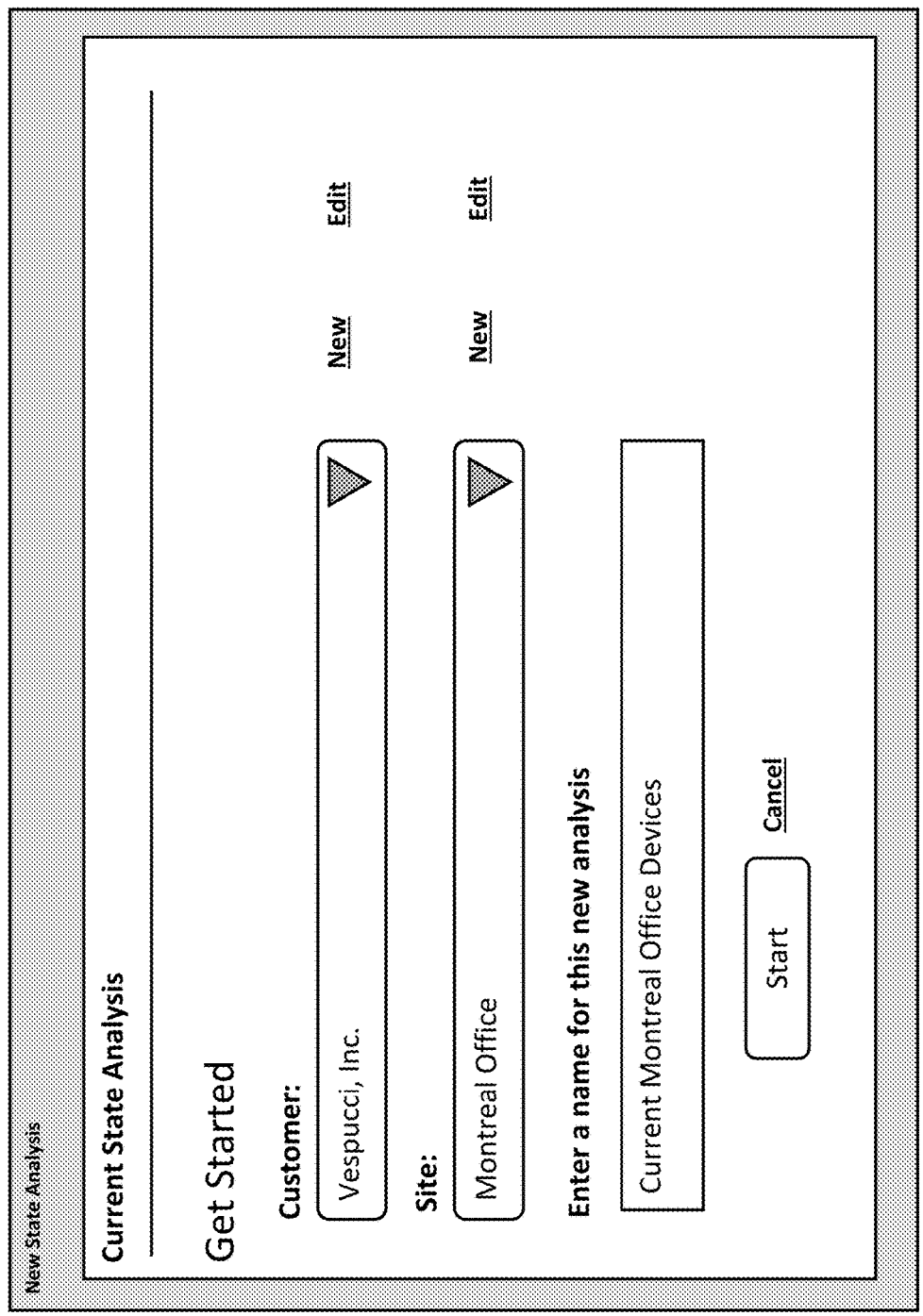

Next, the user selects the customer (i.e. Vespucci, Inc.) and site (i.e. New York office) information from the drop down menu (step S501). Then, he activates the "Start" button, such as shown in FIG. 6C. After the user has activated the "Start" button, he can begin adding devices to the current state analysis of Vespucci (S502), such as by electronically uploading the spreadsheet received from the manager, such as shown in FIG. 6D. Further, the user may also view the file given to him by the manager, such as shown in FIG. 6E.

In the current instance, the file including the information of each device at a certain site (e.g., New York office) is not complete, as evident from the blank spaces in the spreadsheet shown in FIG. 6E.

Figure 6H:
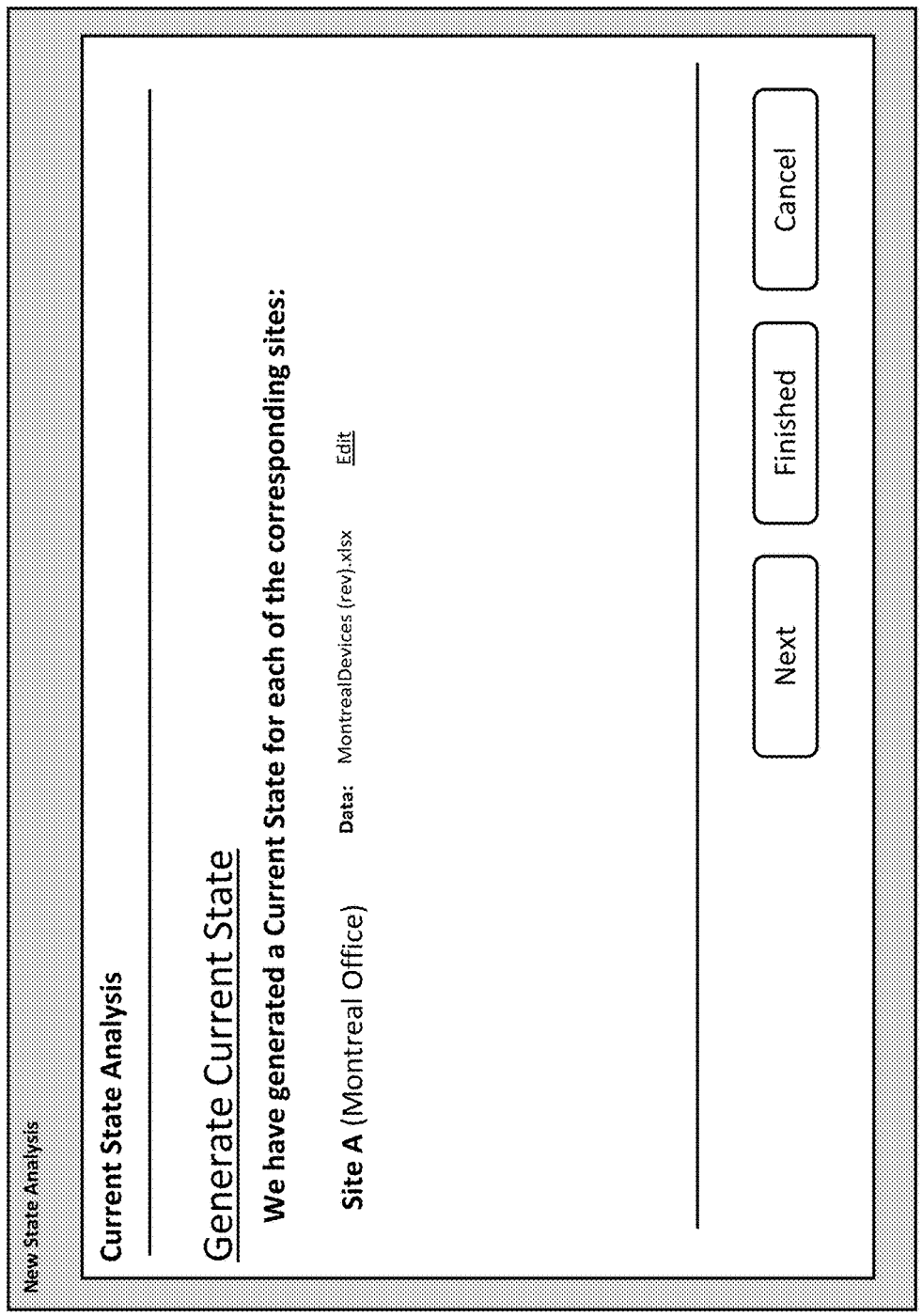

When there is incomplete information in the table of devices, the user can complete the table by activating the "Fill in Blanks" button which causes the device and service management application to communicate with a third party source to obtain information that can complete the table. Once the table is completed, such as shown in FIG. 6F, the user can save the completed table by activating the "Save As" button which causes the file to be saved as "NewYorkDevices(rev).xlsx", such as shown in FIG. 6G. Next, when the user activates the "Next" button, a current state analysis is generated for the New York office (S503), such as shown in FIG. 6H.

Figure 7:
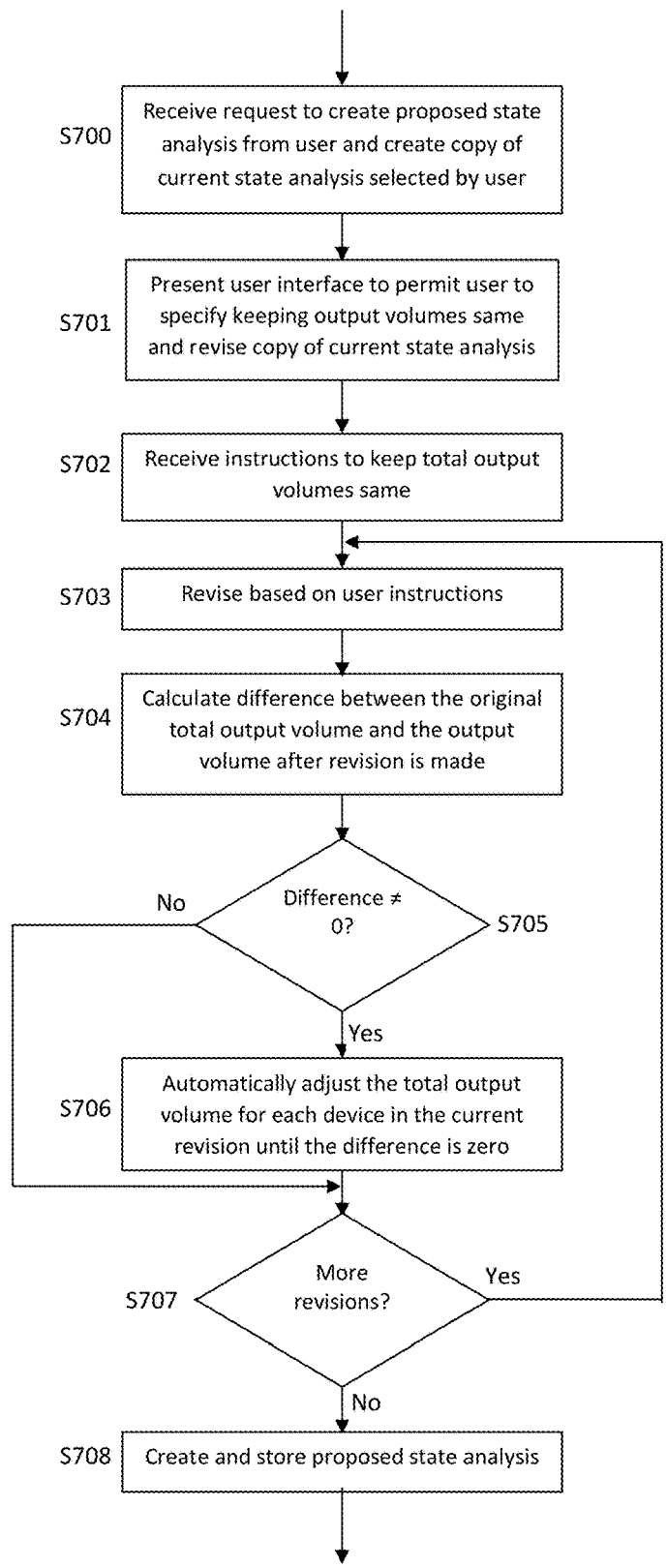
FIG. 7 shows a flow chart of a method, according to an exemplary embodiment, which can be performed in any of the systems of FIGS. 1A and 1B.

FIG. 7 show a method that can be performed by or with an output management application (e.g., 101a) on a terminal apparatus (e.g., 101), according to an exemplary embodiment.

Figure 8A:
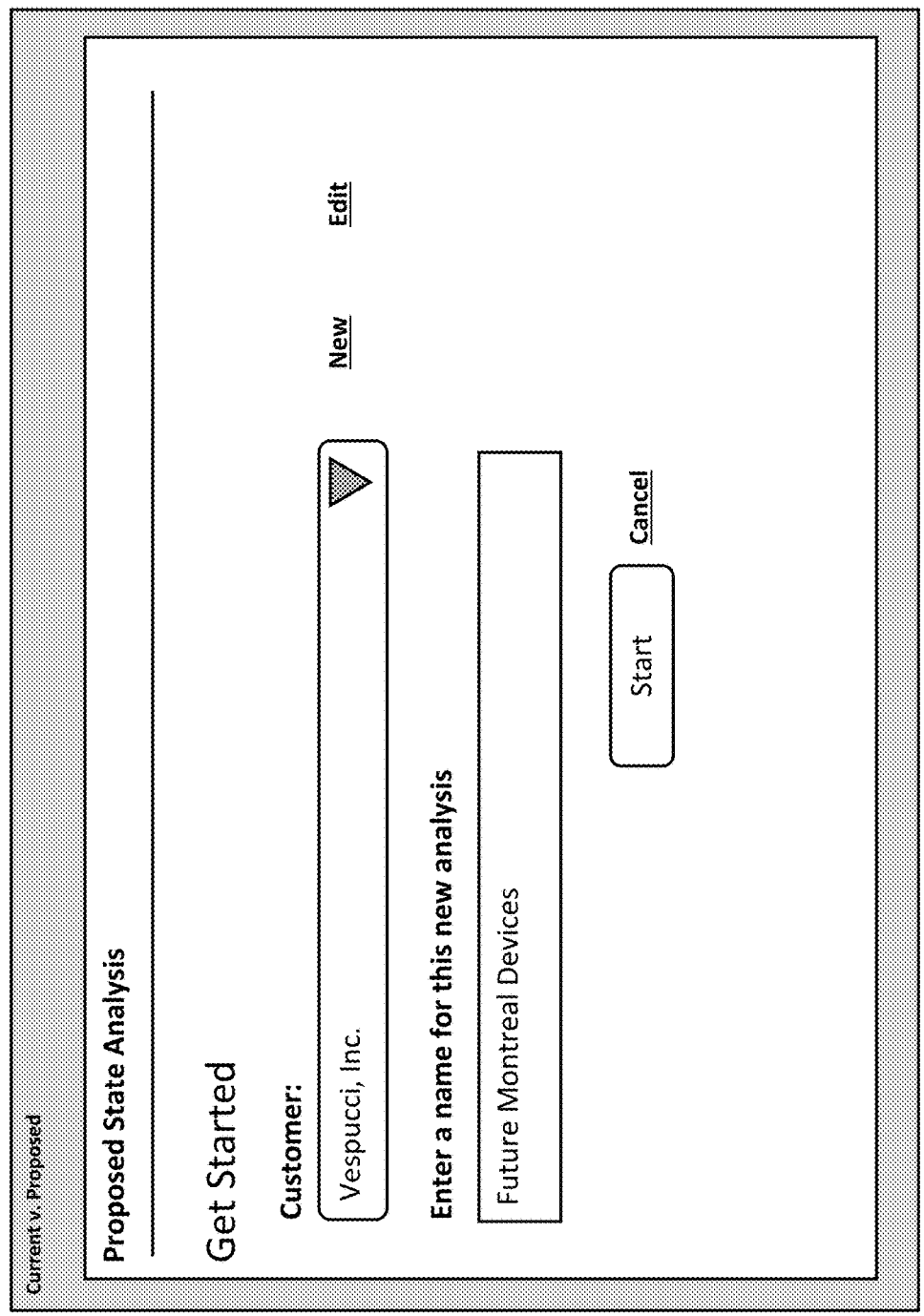
Figure 8B:
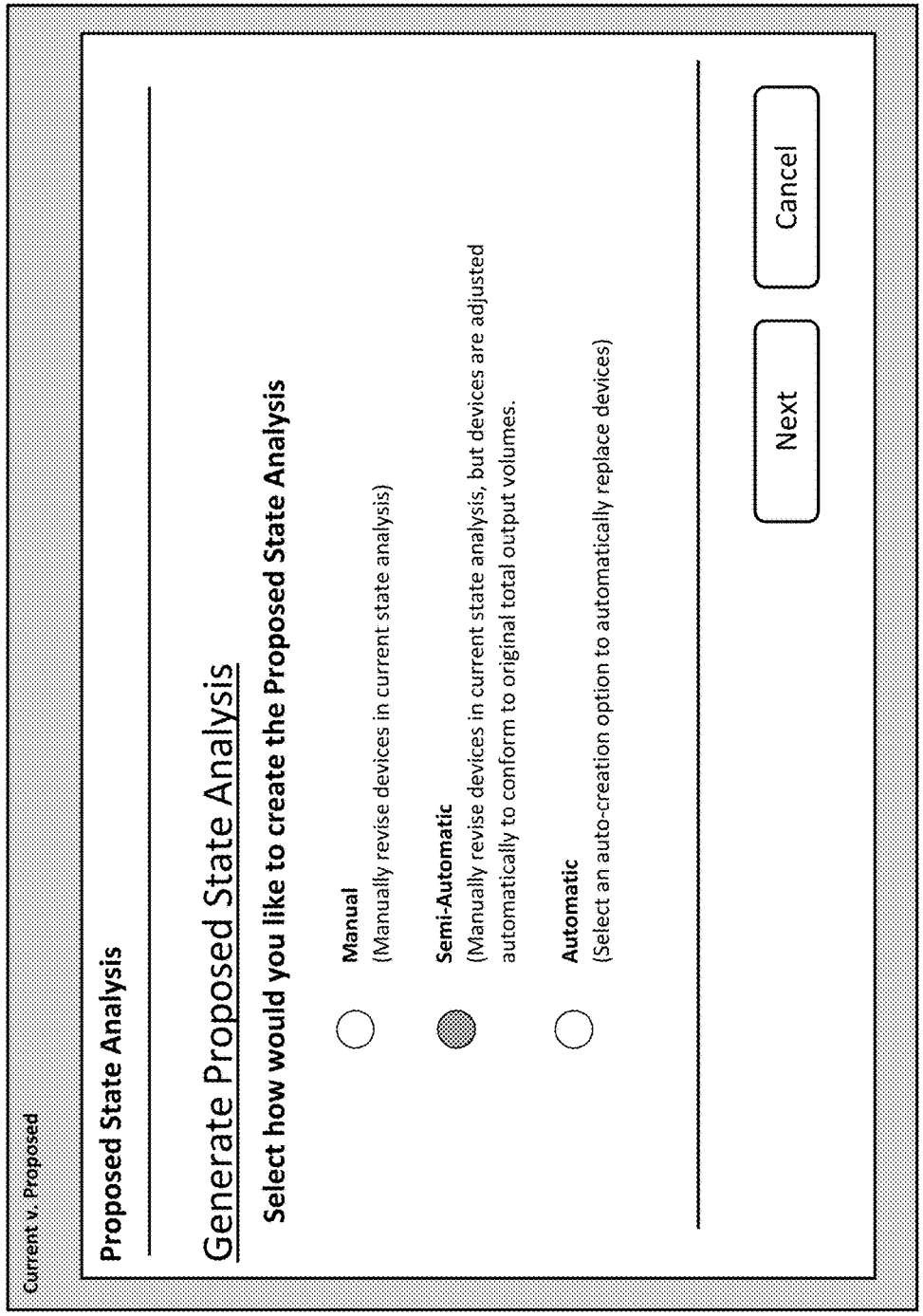

After creating the current state analysis, the user can now create a proposed state analysis by activating the "Basic and Enterprise Analysis" button, such as in FIG. 6B. Next, the user is prompted to select a customer (in this case, Vespucci, Inc.) and create a name for the proposed state analysis (in this case, Future Montreal Devices), such as shown in FIG. 8A. Next, the output management application presents to the user a screen for selecting a method (i.e. automatic, semi-automatic or manual) to perform a proposed state analysis, such as shown in FIG. 8B.

By selecting the manual option, the user can manually revise the current state analysis by adding, removing or editing the devices currently in the proposed state analysis. By selecting the semi-automatic option, the user can manually revise devices in the proposed state analysis. However, the output management application may automatically revise the total monthly output volume of each device for each change made in the proposed state analysis in order to keep the original total monthly output volume corresponding to the current state analysis the same. By selecting the automatic option, the user can select the automatic option in which the output management application generates automatically a proposed state analysis (based off the copy of the current state analysis) according to a predetermined criteria. In this case, the user has selected the semi-automatic option since he was instructed by the manager to keep the total monthly output volume the same.

Subsequently, the user is presented with options to select a current state analysis (e.g., "Site A" and "Site B"), such as shown in FIG. 8C. As shown, the user is not limited to performing analysis for the entirety of Site A. The user has the option to perform a proposed state analysis for subdivision (i.e. enterprise, building, unit, division, floor, department, etc.). Further, when the user selects the site or subdivision, the output management application may keep the total monthly output volume of the proposed state analysis the same as the original total monthly output volume of the selected site or subdivision. In this case, since the manager asked Harold for a proposed state analysis corresponding to the Montreal office, the user selects the "Site B" option.

After receiving the request to create a proposed state analysis and selection of the current state analysis (determined by the site the user has selected), the output management application creates a copy of the current state analysis (step S700). Next, the output management application displays a user interface in which the user can keep the total monthly output volume of the devices the same and, simultaneously, revise the copy of the current state analysis (step S701), such as shown in FIG. 8D. Such interface also includes the amount to keep the total monthly output volumes at (e.g., 200,000). Thus, after receiving instructions to keep the total monthly output volume the same (step S702), the output management application may receive instructions from the user corresponding to revisions (e.g., add device, delete device, modify device, etc.) to be made to the copy of the current state analysis. Once the instructions are received, the output management application makes the revisions accordingly (step S703).

After the revision is made, the output management application determines the new total monthly output volume resulting from the revision. Next, the output management application calculates the difference original total monthly output volume of the current state analysis and the new total monthly output volume resulting from the revision (step S704). In the case that the difference is unequal to zero (step S705, yes), the output management application automatically adjusts (e.g., adding, subtracting, etc.) the device monthly output volume for each device in the current revision until the difference is zero (step S706). Otherwise (step S705, no), the output management application determines if any more revisions are to be made (step S707). In the case that there are more revisions (step S707, yes), the process is repeated. Otherwise (step S707, no), the output management application creates and stores the proposed state analysis (step S708). It should be noted that in an exemplary embodiment, the user may also adjust the total monthly output volume by activating the "edit" button.

Figure 8E:
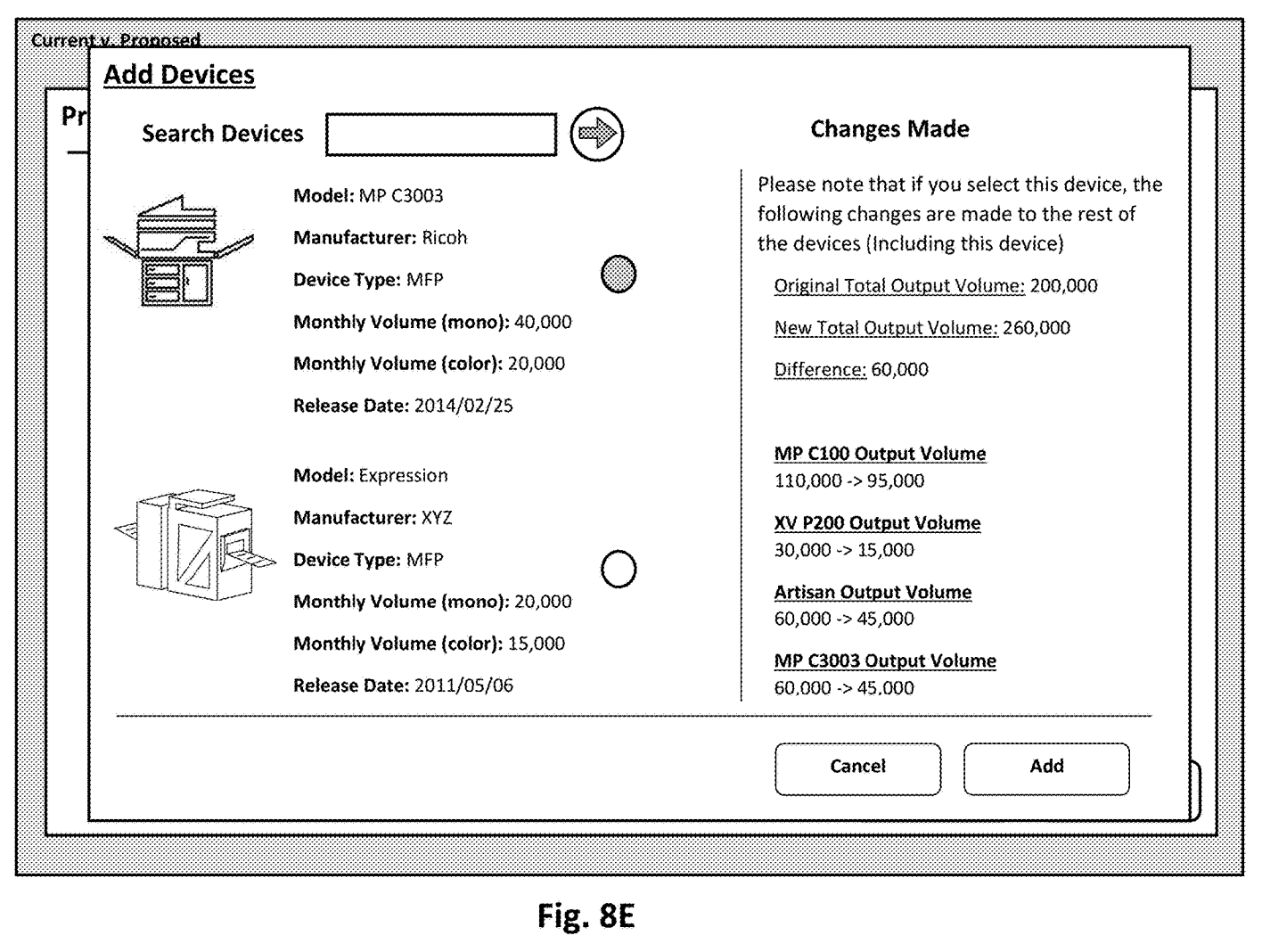

FIGS. 8E and 8F illustrates an example of when the user selects to add a device to the copy of the proposed state analysis. In this case, when the user activates the "Add Device" button, he is presented with a screen which permits him to search for devices by inputting search terms in the search bar. After inputting the search terms, the user is displayed a list of devices that he can select from. Whenever the user selects a device, the right side of the screen under the "Changes Made" section indicates how the selection made by the user affects the devices in the copy of the current state analysis.

For example, the user has selected a device (i.e. MP C3003) that has device monthly output volume of 40,000. When the user makes this selection, the output management application indicates that the new total monthly output volume is 260,000 and that the difference between the original total monthly output volume and the new total monthly output volume is 60,000. Next, the output management application divides the difference by the number of devices (i.e. 4) that are to exist in the copy of the current state analysis after the revision is made, to obtain an adjustment value (i.e. 15,000).

Since the new total monthly output volume is larger than the original total monthly output volume, the adjustment value is subtracted from the device monthly output volume of each of the devices in the revised copy of the current state analysis. The result of the adjustment to each of the devices in the revised copy of the current state analysis is shown to the user. So in other words, even though the user has selected the MP C3003 which includes a default device monthly output volume as 60,000, it does not mean that the MP C3003 in the revised copy of the current state analysis is going to have the same device monthly output volume as 60,000 as when it was selected. Instead, the adjustment value is going to be applied to the MP C3003 as well.

Figure 8G:
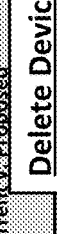

FIGS. 8G and 8H illustrates an example of when the user selects to delete a device from the copy of the current state analysis. In this case, when the user activates the "Delete" button corresponding to a device that he wants to remove from the copy of the current state analysis, he is presented with a screen which permits him to see the changes that result from the deletion of the device. In this case, the output management application indicates that the new total monthly output volume is 155,000 and that the difference between the original total monthly output volume and the new total monthly output volume is 45,000.

Next, the output management application divides the difference by the number of the remaining devices (i.e. 2) that are to exist in the copy of the current state analysis after the revision is made, to obtain an adjustment value (i.e. 30,000). Since the new total monthly output volume is smaller than the original total monthly output volume, the adjustment value is added to the device monthly output volume of each of the remaining devices in the revised copy of the current state analysis. The result of the adjustment to each of the devices in the revised copy of the current state analysis is shown to the user.

Figure 8I:

FIGS. 8I and 8J illustrates an example of when the user selects to modify a device from the copy of the current state analysis. In this case, when the user activates the "Modify" button corresponding to a device that he wants to modify from the copy of the current state analysis, he is presented with a screen which permits him to see the changes that result from the modification of the device. In this case, the user modifies the device monthly output volume of the device MP C100 from 110,000 to 80,000. Thus, the output management application indicates that the new total monthly output volume is 170,000 and that the difference between the original total monthly output volume and the new total monthly output volume is 30,000.

Next, the output management application divides the difference by the number of the remaining devices (i.e. 2) that have not been modified, to obtain an adjustment value (i.e. 15,000). Since the new total monthly output volume is smaller than the original total monthly output volume, the adjustment value is added from the device monthly output volume of each of the remaining devices that have not been modified. The result of the adjustment to each of the devices in the revised copy of the current state analysis is shown to the user.

FIG. 8K is an example of the proposed state analysis generated from the revisions made in FIGS. 8I and 8J.

As discussed supra, the current state analysis or proposed state analysis may be performed for a logical unit that corresponds to a physical location [such as an enterprise site, a building, a floor, etc.) or an organizational unit [such as a division, a department, another business unit, etc.]. An example will now be discussed.

In such example, when a proposed state analysis is created based on an existing current state analysis, user can choose an option to "Keep output volumes for the site". When this option is selected, the output management application calculates the total monthly output volumes for the proposed state when (i) the user adds new devices to the proposed state, or (ii) when the user modifies an existing device's monthly volume usage, or (iii) the user deletes existing devices. If there are any changes between total monthly volumes for the devices in the current state analysis for the site and total monthly volumes for the devices in the proposed state analysis for the site, the system popups the message "Total monthly volume is different between current state and proposed state for this site." and shows the total monthly volumes for current state and proposed state and their difference. Thus, based on to the message, users can know the difference in total monthly volumes between the current state and the proposed state and easily correct the volumes in the proposed state.

The devices can be associated with physical location (e.g., building/floor, etc.) and organization (e.g., business unit, division, department, etc.). The user can add new devices in some building/floor, etc., and can move devices from building/floor to another building/floor, and can remove devices from building/floor. The device can be similarly assigned to organization unit, such as business unit/division/department. As a result, the number of devices, types of devices and total monthly output volumes can be different in each Building/Floor and Business Unit/Division/Department between current state and proposed state.

In such example, the physical location and organization data may be arranged as follows. In such data, building and floor have a parent-child relationship. Similarly, business unit, division and department have parent-child-grandchild relationship.

| | | | | [Device Table] | | | | |
|---|---|---|---|---|---|---|---|---|
| ID | Model | Mono Volume | Color Volume | Building ID | Floor ID | Business Unit ID | Div ID | Dept ID |
| 1 | Ricoh MP 300 | 2000 | 1000 | 1 | 1 | 1 | 1 | 1 |
| 2 | Ricoh MP 400 | 1000 | 500 | 2 | 2 | 2 | 2 | 2 |

[Building Table]

| ID | Building Name | Site ID |
|---|---|---|
| 1 | Building A | 1 |
| 2 | Building B | 1 |

[Floor Table]

| ID | Floor Name | Building ID |
|---|---|---|
| 1 | Floor A | 1 |
| 2 | Floor B | 1 |
| 3 | Floor 1 | 2 |
| 4 | Floor 2 | 2 |

[Business Unit Table]

| ID | Business Unit Name | Site ID |
|---|---|---|
| 1 | Unit A | 1 |
| 2 | Unit B | 1 |

[Division Table]

| ID | Division Name | Business Unit ID |
|---|---|---|
| 1 | Division A | 1 |
| 2 | Division B | 1 |

[Department Table]

| ID | Dept Name | Division ID |
|---|---|---|
| 1 | Dept A | 1 |
| 2 | Dept B | 1 |

In Proposed State creation, user can choose an option how to keep the monthly volume: (i) Keep Monthly Volume by physical location; or (ii) Keep Monthly Volume by organization. When "Keep Monthly Volume by physical location" is selected, the system calculates the total monthly volume for each Building and Floor in adding/modifying/deleting devices in Proposed State. If any difference is found between current state and proposed state, the system popups the message "Total monthly volume is different between Current State and Proposed State for Building A" and shows the total monthly volume for Current State and Proposed State for Building A and their difference. When "Keep Monthly Volume by organization" is selected and any difference is found between Current State and Proposed State for any organization, the system popups the message "Total monthly volume is different between Current State and Proposed State for Unit A" and shows the total monthly volume for Current State and Proposed State for Unit A and their difference.

The aforementioned specific embodiments are illustrative, and many variations can be introduced on these embodiments without departing from the spirit of the disclosure or from the scope of the appended claims. In addition, elements and/or features of different examples and illustrative embodiments may be combined with each other and/or substituted for each other within the scope of this disclosure and appended claims.

For example, the orders in which the steps are performed in the aforementioned methods are not limited to those shown in the examples of FIGS. 5 and 7, and may be switched as long as similar results are achieved. Also, it should be noted that the methods illustrated in the examples of FIGS. 5 and 7 may be implemented using any of the systems described in connection with FIGS. 1A and 1B, or an equivalent or similar system.

What is claimed is:

1. An output management application configured to generate a proposed state analysis regarding a proposed state proposed for an organization, based on a current state analysis of a current fleet of output devices employed by the organization, the output management application including one or more programs of instructions embodied in a non-transitory computer readable medium and executable by a computer to configure the computer to perform a method comprising:

(a) providing an application user interface (UI) to permit a user to specify and modify a proposed fleet of output devices in the proposed state;

(b) estimating total output volume corresponding to the proposed fleet when the user operates the application user interface to perform any one or more of add a device to the proposed fleet, delete a device from the proposed fleet, and modify an allotted monthly volume usage of a specified device in the proposed fleet, and performing a comparison of (i) total output volume corresponding to the current fleet reflected in the current state analysis, and (ii) the estimated total output volume corresponding to the proposed fleet of output devices; and (c) providing by the application user interface, when the output management application determines, based on the comparison performed in (b), that the estimated total output volume corresponding to the proposed fleet of output devices is different from the total output volume corresponding to the current fleet reflected in the current state analysis, (i) a notification that indicates a difference in the total output volumes as between the proposed state including the proposed fleet and the current state reflected in the current state analysis, and (ii) user interface provision to permit the user to specify an instruction, via the application user interface, to further modify the proposed fleet indicated in the proposed state and repeat (b)-(c) for the proposed fleet as modified.

2. The output management application as claimed in claim 1, wherein the application user interface includes a UI part to permit the user to select an option to keep total output volume same, and wherein when the keep total output volume same option has been selected and the output management application determines in (c) that the total output volumes as between the proposed fleet of output devices and the current fleet reflected in the current state analysis are different, the application user interface displays the notification to alert the user that the total output volumes as between the proposed state and the current state are not the same.

3. The output management application as claimed in claim 1, wherein when the output management application determines in (c) that the total output volumes as between the proposed fleet of output devices and the current fleet reflected in the current state analysis are different, the application user interface displays the total output volumes for the proposed state and the current state and displays the difference in total output volumes.

4. The output management application as claimed in claim 1, wherein the application user interface permits the user to modify the allotted monthly volume usage of the specified device manually, in the proposed fleet.

5. The output management application as claimed in claim 1, wherein
the application user interface includes a UI part to permit the user to select an option to keep total output volume same, and the method further comprises:
when the keep total output volume same option has been selected and the output management application determines in (c) that the total output volumes as between the proposed fleet of output devices and the current fleet reflected in the current state analysis are different, automatically adjusting for each output device in the proposed fleet of output devices, the allotted monthly volume usage of the output device to reduce the difference in total output volumes as between the proposed fleet of output devices and the current fleet reflected in the current state analysis.

6. The output management application as claimed in claim 5, wherein when the allotted monthly volume usage of the output devices in the proposed fleet is adjusted, the application user interface displays the total output volumes for the proposed fleet and the current fleet of output devices in the current state analysis for the output devices.

7. The output management application as claimed in claim 5, wherein when the allotted monthly volume usage of the output devices in the proposed fleet is adjusted, the application user interface displays a message indicating that adjustment of the allotted monthly volume usage has been automatically performed for the output devices in the proposed fleet and the application user interface provides a reverse adjustment UI part for the user to request that the adjustment be reversed.

8. The output management application as claimed in claim 1, wherein the application user interface includes a UI part to permit the user to select one of keep monthly volume by physical location and keep monthly volume by organizational unit.

9. The output management application as claimed in claim 8, wherein
the organization includes one or more logical units,
when the user selection through the UI part of the application user interface is keep monthly volume by physical location, each logical unit is (i) an enterprise site, (ii) a building or (iii) a floor, and
for the proposed fleet, total output volumes for said each logical unit by physical location is estimated in (c).

10. The output management application as claimed in claim 8, wherein
the organization includes one or more logical units,
when the user selection through the UI part of the application user interface is keep monthly volume by organizational unit, each logical unit is (i) a division, (ii) a department or (iii) another business unit, and
total output volume for said each logical unit by organizational unit is estimated in (b).

11. The output management application as claimed in claim 1, wherein when the output management application determines that the estimated total output volume for the proposed fleet of output devices is greater than the total output volume of the current fleet reflected in the current state analysis, the difference in the total output volumes as between the proposed fleet of output devices and the current fleet reflected in the current state analysis is calculated, the difference amongst the proposed fleet of output devices is divided, and for each output device amongst one or more output devices in the proposed fleet, the allotted monthly volume usage of the output device is reduced by the divided difference.

12. The output management application as claimed in claim 1, wherein when the output management application determines that the estimated total output volume of the output devices in the proposed fleet of output devices is greater than the total output volume of the current fleet reflected in the current state analysis, a percentage of the estimated total output volume of the proposed fleet of output devices constituted by the difference in total output volumes as between the proposed fleet of output devices and the current fleet reflected in the current state analysis is calculated, and for each output device amongst one or more output devices in the proposed fleet, the allotted monthly volume usage of the output device is automatically reduced by the calculated percentage.

13. The output management application as claimed in claim 1, wherein the organization includes one or more logical units,
the application user interface permits the user to move an output device from one logical unit to another logical unit in the proposed fleet, and the method further comprises:
when the user moves the output device from the one logical unit to said another logical unit in the proposed fleet, estimating the total output volumes for the output devices in the proposed fleet for said another logical unit, and when the output management application determines that there is a difference in the total output volumes as between the proposed fleet and the current fleet the current state analysis for said another logical unit, automatically adjusting for each output device amongst the output devices in the proposed fleet for the other logical unit, the allotted monthly volume usage of the output device to reduce the difference in the total output volumes as between the proposed fleet and the current fleet the current state analysis for the other logical unit.

* * * * *